(12) United States Patent
Sugie (10) Patent No.: US 10,195,926 B2
(45) Date of Patent: Feb. 5, 2019

(54) VEHICLE SIDE DOOR STRUCTURE

(71) Applicant: TOYOTA JIDOSHA KABUSHIKI KAISHA, Toyota-shi (JP)

(72) Inventor: Kazuki Sugie, Miyoshi (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 123 days.

(21) Appl. No.: 15/289,336

(22) Filed: Oct. 10, 2016

(65) Prior Publication Data

US 2017/0136856 A1    May 18, 2017

(30) Foreign Application Priority Data

Nov. 16, 2015   (JP) ................................ 2015-224254

(51) Int. Cl.
  *E06B 3/00*        (2006.01)
  *B60J 5/04*        (2006.01)
  (Continued)

(52) U.S. Cl.
  CPC ............. *B60J 5/0493* (2013.01); *B60J 5/042* (2013.01); *B60J 5/0411* (2013.01); *B60J 5/0415* (2013.01); *B60J 5/0426* (2013.01); *G01S 7/02* (2013.01); *G01S 13/931* (2013.01); *G01S 15/04* (2013.01); *G01S 15/931* (2013.01); *G01S 17/936* (2013.01); *H01Q 1/3241* (2013.01); *G01S 2007/027* (2013.01); *G01S 2013/9364* (2013.01);
  (Continued)

(58) Field of Classification Search
  CPC ........ B60J 5/0493; B60J 5/0411; B60J 5/042; G01S 15/04

USPC .......................................... 49/501; 296/146.6
See application file for complete search history.

(56) References Cited

U.S. PATENT DOCUMENTS 5,179,256 A *  1/1993  Haglund ............. B60R 21/0136
                                                              180/282
5,281,780 A *  1/1994  Haland .................. B60J 5/0437
                                                              180/274
(Continued)

FOREIGN PATENT DOCUMENTS

JP           4-41440 U      4/1992
JP           9-301123       11/1997
(Continued)

OTHER PUBLICATIONS

Office Action dated Dec. 5, 2017 in Japanese Patent Application No. 2015-224254 (with English language translation), 4 pages.

*Primary Examiner* — Jerry E Redman
(74) *Attorney, Agent, or Firm* — Oblon, McClelland, Maier & Neustadt, L.L.P.

(57) ABSTRACT

A vehicle side door structure that includes: a side door body portion configured to open and close a side door opening, the side door body portion including a door inner panel and a door outer panel; and a sensor placed inside the side door body portion, the sensor including a detection component configured to face outward in the vehicle width direction and to detect information in the side direction of the vehicle by using a detection medium, wherein a transmissive portion is disposed on the vehicle width direction outside of the detection component, the transmissive portion configuring part of the door outer panel and being configured by a material that allows the detection medium to be transmitted through the material.

8 Claims, 5 Drawing Sheets

(51) Int. Cl.
*G01S 15/04* (2006.01)
*G01S 15/93* (2006.01)
*G01S 17/93* (2006.01)
*G01S 7/02* (2006.01)
*G01S 13/93* (2006.01)
*H01Q 1/32* (2006.01)

(52) U.S. Cl.
CPC ................. *G01S 2013/9367* (2013.01); *G01S 2013/9385* (2013.01); *G01S 2015/937* (2013.01)

(56) References Cited

U.S. PATENT DOCUMENTS

| | | | | |
|---|---|---|---|---|
| 5,435,618 | A * | 7/1995 | Sacco | B60N 2/4235 |
| | | | | 280/749 |
| 5,868,456 | A * | 2/1999 | Kowalski | B60J 5/0444 |
| | | | | 296/146.6 |
| 5,934,703 | A * | 8/1999 | Mimura | B60R 21/0132 |
| | | | | 180/274 |
| 5,934,743 | A * | 8/1999 | Nohr | B60R 19/00 |
| | | | | 296/146.6 |
| 6,312,045 | B2 * | 11/2001 | Kitagawa | B62D 25/02 |
| | | | | 292/24 |
| 6,460,648 | B2 * | 10/2002 | Kleinberg | B60R 21/013 |
| | | | | 180/274 |
| 6,895,312 | B2 * | 5/2005 | Iida | B60R 21/013 |
| | | | | 180/277 |
| 7,287,785 | B2 * | 10/2007 | Schupp | E05B 77/06 |
| | | | | 292/201 |
| 7,380,632 | B2 * | 6/2008 | Claar | B60R 21/013 |
| | | | | 180/271 |
| 7,530,628 | B2 * | 5/2009 | Gabler | B60J 5/0437 |
| | | | | 296/146.6 |
| 7,588,116 | B2 * | 9/2009 | Kamiya | B60R 21/013 |
| | | | | 180/271 |
| 7,735,901 | B2 * | 6/2010 | Melz | B60J 5/043 |
| | | | | 296/146.6 |
| 7,837,255 | B1 * | 11/2010 | Okutsu | B60J 5/0425 |
| | | | | 280/735 |
| 8,061,762 | B2 * | 11/2011 | Arvidsson et al. | 296/146.6 |
| 8,267,464 | B2 * | 9/2012 | Konchan | B60J 5/0479 |
| | | | | 292/150 |
| 8,412,415 | B2 * | 4/2013 | Metzler | B60R 21/0136 |
| | | | | 296/146.6 |
| 9,004,529 | B2 * | 4/2015 | Torii | B60R 21/0428 |
| | | | | 280/730.2 |
| 9,718,330 | B2 * | 8/2017 | Kindaichi | B60J 5/0443 |
| 2006/0131927 | A1 * | 6/2006 | Blust | B60J 5/0444 |
| | | | | 296/146.6 |
| 2007/0145771 | A1 * | 6/2007 | Tanaka | B60J 1/17 |
| | | | | 296/146.6 |
| 2008/0315619 | A1 * | 12/2008 | Oka | B60J 5/0437 |
| | | | | 296/146.6 |
| 2009/0322117 | A1 * | 12/2009 | Arvidsson | B60J 5/0444 |
| | | | | 296/146.6 |
| 2010/0090495 | A1 * | 4/2010 | Suzuki | B60J 5/0468 |
| | | | | 296/146.6 |
| 2010/0201108 | A1 * | 8/2010 | Iwayama | B60R 7/046 |
| | | | | 280/730.2 |
| 2011/0125372 | A1 * | 5/2011 | Ito | B60R 21/0132 |
| | | | | 701/45 |
| 2011/0221229 | A1 * | 9/2011 | Rouhana | B60J 5/042 |
| | | | | 296/146.6 |
| 2013/0024103 | A1 | 1/2013 | Schneider | |
| 2014/0361576 | A1 * | 12/2014 | Storgato | B60J 5/0416 |
| | | | | 296/146.6 |

FOREIGN PATENT DOCUMENTS

| | | |
|---|---|---|
| JP | 10-317747 A | 12/1998 |
| JP | 2009-37542 | 2/2009 |
| JP | 2013-518333 | 5/2013 |

* cited by examiner

FIG.1

VEHICLE SIDE DOOR STRUCTURE

CROSS-REFERENCE TO RELATED APPLICATION

This application is based on and claims priority under 35 USC 119 from Japanese Patent Application No. 2015-224254 filed on Nov. 16, 2015, the disclosure of which is incorporated by reference herein.

BACKGROUND

Technical Field

The present embodiments relate to a vehicle side door structure.

Related Art

Structures are known where a detection device that detects the surroundings in the side direction of a vehicle is placed in a vehicle side portion (see Japanese Patent Application Laid-open (JP-A) No. H09-301123, JP-A No. 2009-37542, and Japanese National Phase Publication No. 2013-518333).

For example, JP-A No. H09-301123 discloses a structure where an ultrasonic sensor is housed inside a side door. To briefly describe this structure, an opening is formed in an outer handle portion for opening and closing the side door, and the ultrasonic sensor is attached to a sensor attachment portion disposed in the opening. The ultrasonic sensor is placed in a position facing the opening in the outer handle portion and detects objects in the side direction of the vehicle by sending and receiving signals through the opening in the outer handle portion.

However, in the related art disclosed in JP-A No. H09-301123, the ultrasonic sensor is set in a position facing the opening, which is disadvantageous in terms of keeping the ultrasonic sensor waterproof and dustproof, and thus there is room for improvement with respect to well maintaining the detection precision of the ultrasonic sensor.

SUMMARY

In view of the circumstances described above, the present disclosure provides a vehicle side door structure that can well maintain the detection precision of a sensor that detects the surroundings in the side direction of the vehicle.

A first aspect of the disclosure provides a vehicle side door structure including:

a side door body portion configured to open and close a side door opening, the side door body portion including a door inner panel and a door outer panel; and a sensor placed inside the side door body portion, the sensor including a detection component configured to face outward in the vehicle width direction and to detect information in the side direction of the vehicle by using a detection medium, wherein a transmissive portion is disposed on the vehicle width direction outside of the detection component, the transmissive portion configuring part of the door outer panel and being configured by a material that allows the detection medium to be transmitted through the material.

According to this configuration, the sensor is placed inside the side door body portion, and the detection component facing outward in the vehicle width direction uses the detection medium to detect information in the side direction of the vehicle. Furthermore, the transmissive portion that configures part of the door outer panel and is configured by a material that allows the detection medium to be transmitted through it is disposed on the vehicle width direction outside of the detection component. This makes it possible for information in the side direction of the vehicle to be detected by the sensor, and at the same time the sensor is not exposed to the door outer surface side and can be kept waterproof and dustproof.

A second aspect of the disclosure provides the vehicle side door structure according to the first aspect, wherein a reinforcement member placed with its longitudinal direction coinciding with the vehicle forward and rearward direction is disposed inside the side door body portion, and the sensor is placed on the vehicle width direction outside of the reinforcement member and is secured to the reinforcement member.

According to this configuration, the reinforcement member placed with its longitudinal direction coinciding with the vehicle forward and rearward direction is disposed inside the side door body portion, and the sensor is placed on the vehicle width direction outside of the reinforcement member. For this reason, the detection performance of the sensor is not impeded even when the reinforcement member is disposed. Furthermore, the sensor is secured to the reinforcement member, so attachment stiffness for the sensor can be ensured and vibration of the sensor during vehicle travel and so forth is controlled. Consequently, the detection precision of the sensor can be kept from being lowered by vibration during vehicle travel and so forth.

A third aspect of the disclosure provides the vehicle side door structure according to the first aspect or the second aspect, wherein a door glass is capable of being housed inside the side door body portion, and the sensor is placed on the vehicle width direction outside of the position where the door glass is housed inside the side door body portion.

According to this configuration, the sensor is placed on the vehicle width direction outside of the position where the door glass is housed inside the side door body portion, so the detection performance of the sensor is not affected by the door glass even when the door glass is placed in its housed position.

A fourth aspect of the disclosure provides the vehicle side door structure according to the second aspect or the third aspect, wherein the reinforcement member is secured to the door outer panel.

According to this configuration, the reinforcement member is secured to the door outer panel, so the sensor can be placed further outward in the vehicle width direction. For this reason, the detection precision of the sensor is better ensured.

A fifth aspect of the disclosure provides the vehicle side door structure according to any one of the second to fourth aspects, and the fifth aspect, wherein a through hole, through which is passed a wire from a body section of the sensor, is formed in the reinforcement member, and the section of the wire passed through the through hole from the side of the body section of the sensor is placed on the vehicle width direction inside of the reinforcement member.

According to this configuration, the section of the wire passed through the through hole from the side of the body section of the sensor is placed on the vehicle width direction inside of the reinforcement member, so the section of the wire passed through the through hole from the side of the body section of the sensor is protected by the reinforcement member, and the effect that the wire has on the detection performance of the sensor can be reduced.

A sixth aspect of the disclosure provides the vehicle side door structure according to any one of the second to fourth aspects, wherein the reinforcement member is a beltline reinforcement placed along a beltline.

According to this configuration, the reinforcement member is a beltline reinforcement, so the sensor can be placed near the upper end portion of the side door body portion, and information in the side direction of that height position can be detected by the sensor.

A seventh aspect of the disclosure provides the vehicle side door structure according to any one of the first to six aspects, wherein the door outer panel includes:
a door outer panel body, the door outer panel body configuring a body of the door outer panel and having a through portion formed in a range including the section opposing the vehicle width direction outside of the detection component and
a transmissive member configured to include the transmissive portion, the transmissive member being attached to the door outer panel body in a state in which the transmissive member closes off the through portion, and
a vehicle width direction outside surface of the transmissive portion is placed in alignment with a vehicle width direction outside surface of the door outer panel body.

According to this configuration, even when the door outer panel is equipped with the door outer panel body and the transmissive portion, the door outer panel when seen from the vehicle outside is visually attractive.

As described above, according to the vehicle side door structure of the present disclosure, the vehicle side door structure has the superior effect that it can well maintain the detection precision of a sensor that detects the surroundings in the side direction of the vehicle.

BRIEF DESCRIPTION OF THE DRAWINGS

Exemplary embodiments of the present invention will be described in detail based on the following figures, wherein.

DETAILED DESCRIPTION

First Embodiment

A vehicle side door structure pertaining to a first embodiment of the present invention will be described using FIG. 1 and FIG. 2. Arrow FR appropriately shown in these drawings indicates a vehicle forward direction, arrow UP indicates a vehicle upward direction, and arrow IN indicates an inward direction in a vehicle width direction.

Figure 1:
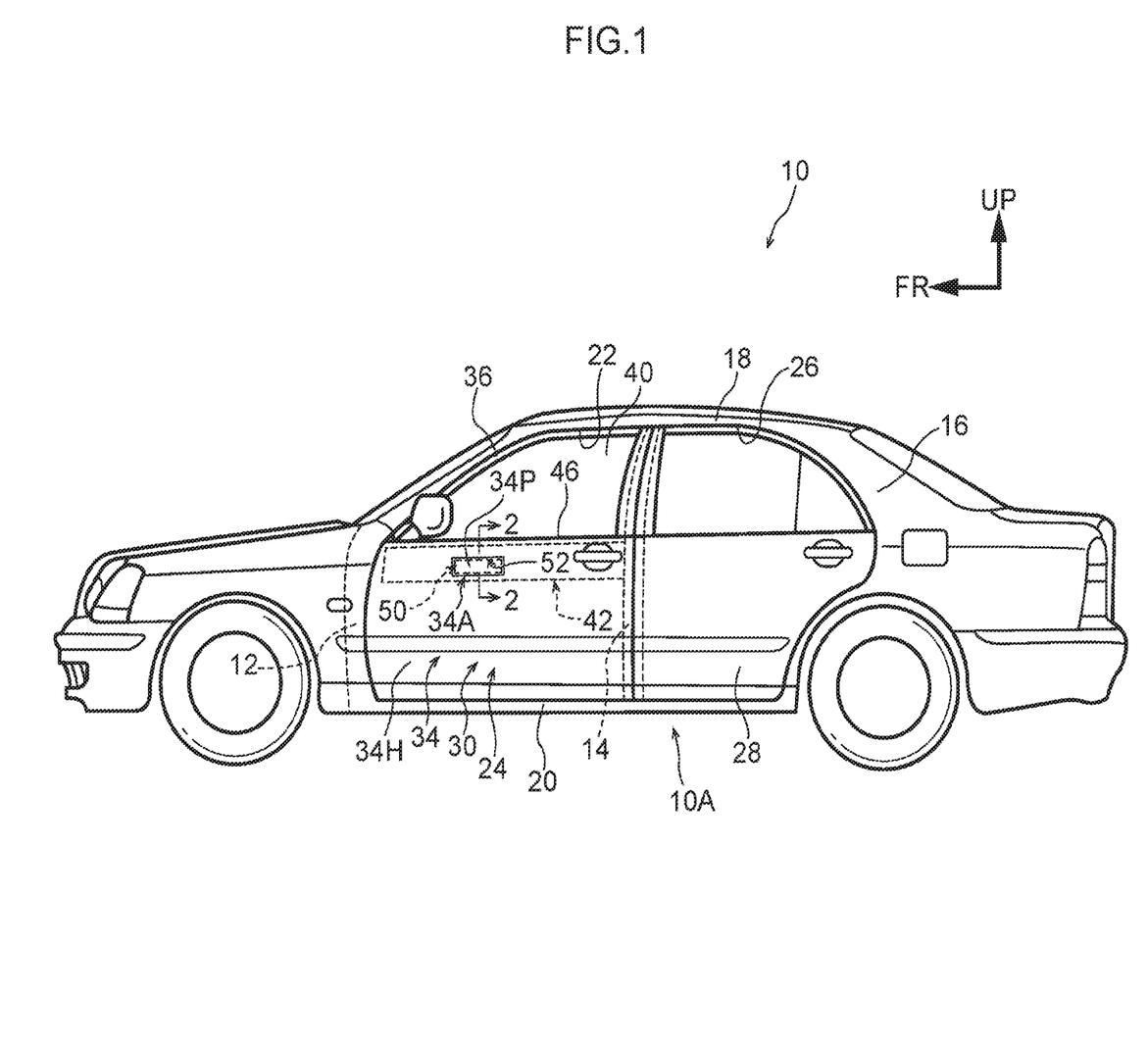
FIG. 1 is a side view showing a vehicle (automobile) configured to include a front side door to which a vehicle side door structure pertaining to a first embodiment of the present invention has been applied.

In FIG. 1, a vehicle 10 (automobile) configured to include a front side door 24 to which the vehicle side door structure pertaining to the present embodiment has been applied is shown by way of a side view. As shown in FIG. 1, in a vehicle side portion 10A, a front pillar 12, a center pillar 14, and a rear pillar 16 are vertically disposed in this order from the vehicle front side. The front pillar 12, the center pillar 14, and the rear pillar 16 are pillar-like vehicle body skeletal members vertically disposed along the substantially vehicle upward and downward direction.

The upper end portions of the front pillar 12 and the center pillar 14 are joined to a roof side rail 18. The roof side rail 18 is disposed along the vehicle forward and rearward direction on both vehicle width direction side portions of a vehicle roof portion. The lower end portions of the front pillar 12 and the center pillar 14 are joined to a rocker 20. The rocker 20 is disposed along the vehicle forward and rearward direction on both vehicle width direction side portions of a vehicle floor portion.

Formed in the front side of the vehicle forward and rearward direction middle portion of the vehicle side portion 10A is a substantially rectangular front side door opening 22 serving as a side door opening formed surrounded by the front pillar 12, the center pillar 14, the roof side rail 18, and the rocker 20. On the vehicle rear side of the front door opening 22 is formed a rear side door opening 26 as a side door opening on the rear side. The front side door opening 22 is opened and closed by the front side door 24, and the rear side door opening 26 is opened and closed by a rear side door 28.

Figure 2:
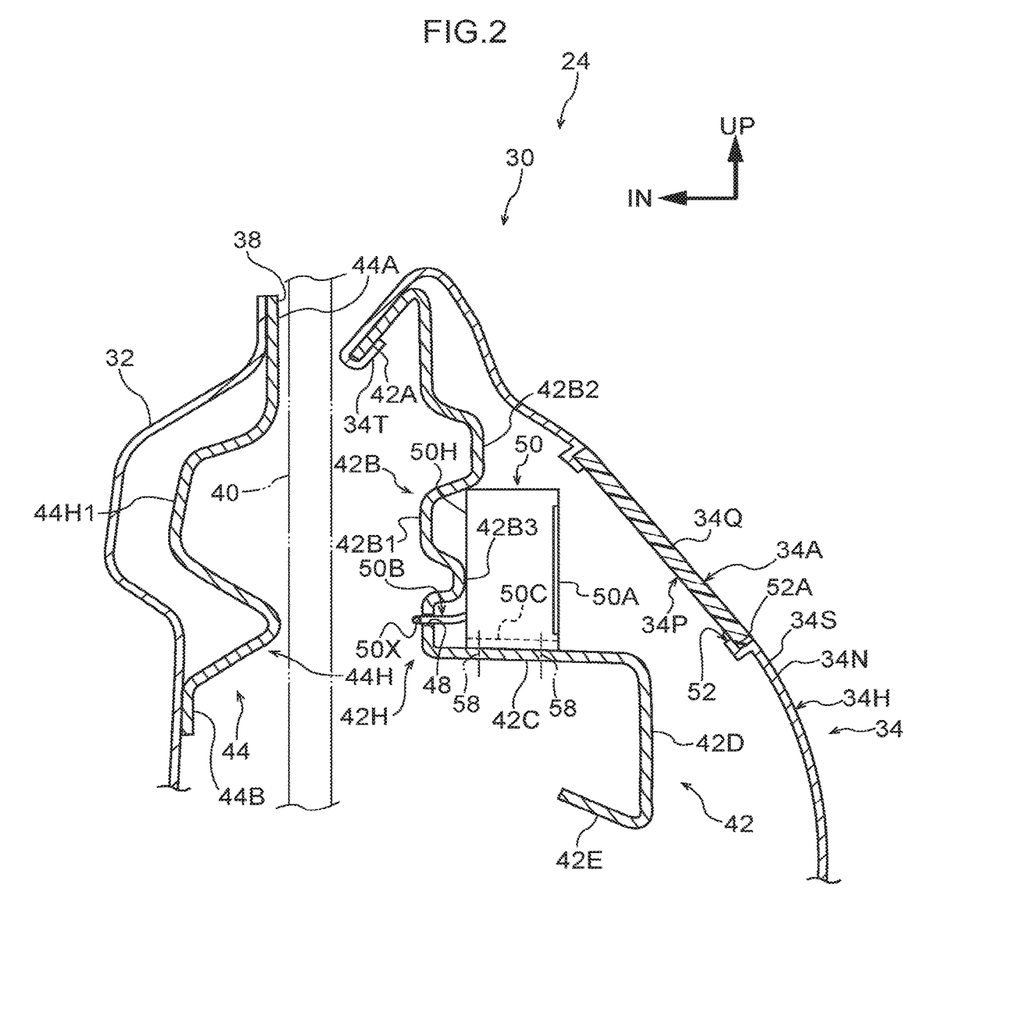
FIG. 2 is an enlarged longitudinal sectional view showing a cross section cut along line 2-2 of FIG. 1.

In FIG. 2 is shown an enlarged longitudinal sectional view of a cross section cut along line 2-2 of FIG. 1. Directions regarding the front side door 24 (hereinafter abbreviated as "the side door 24") appearing in the following description are directions in a state in which the front side door opening 22 (see FIG. 1) is closed by the side door 24.

As shown in FIG. 2, the side door 24 has a side door body portion 30 equipped with a door inner panel 32 placed on the cabin interior side and configuring the door inner panel and a door outer panel 34 placed on the cabin exterior side of the door inner panel 32 and configuring the door outer panel. A door outer panel body 34H configuring the body of the door outer panel 34 and the door inner panel 32 are made of a sheet metal material (e.g., steel sheets). The configuration of the door outer panel 34 will be described later.

Figure 4:
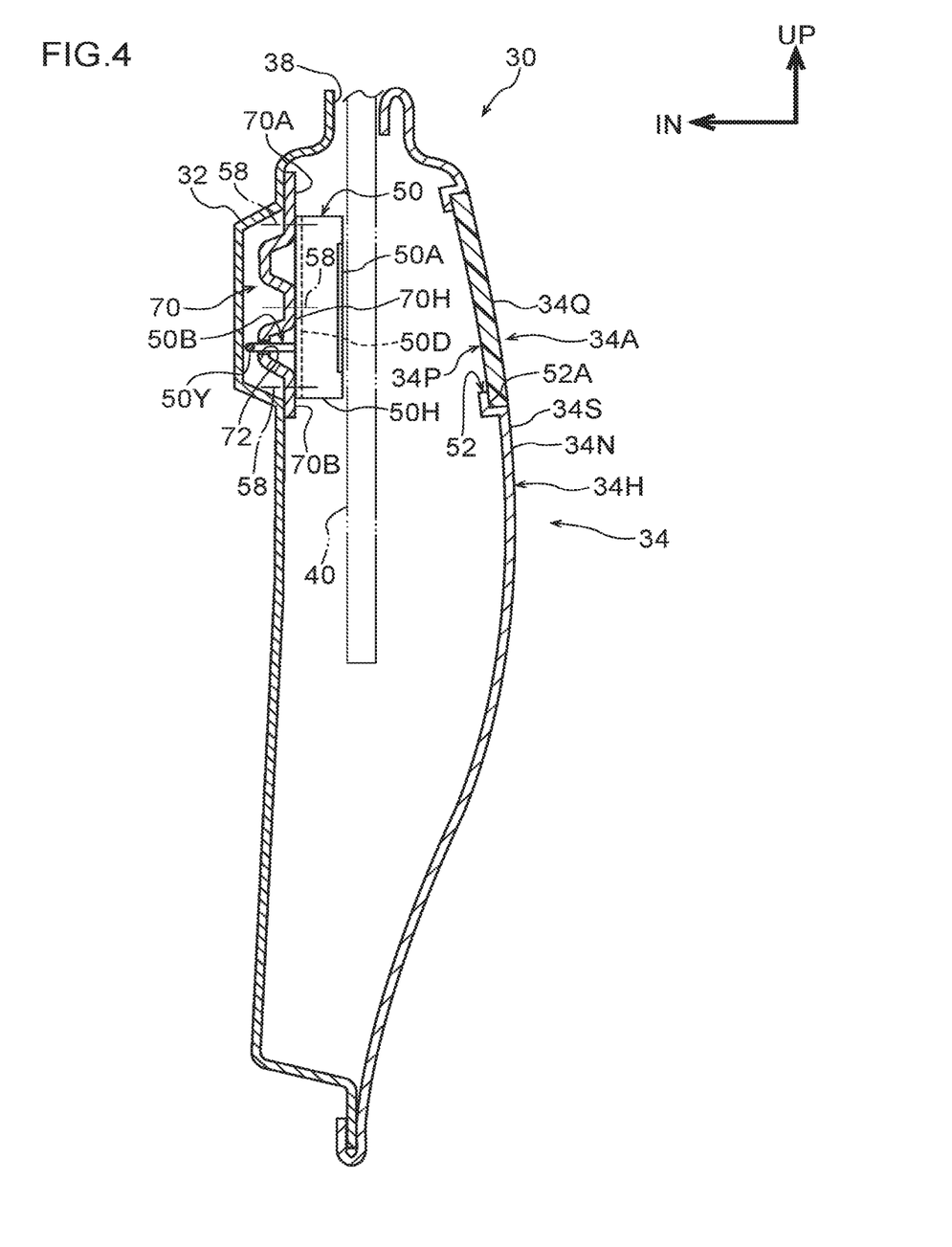
FIG. 4 is a longitudinal sectional view showing a vehicle side door structure pertaining to a third embodiment of the present invention.

The terminal portion of the door outer panel 34 (the door outer panel body 34H) and the terminal portion of the door inner panel 32 are hemmed together, and the pouch-like side door body portion 30 is configured by the door outer panel 34 and the door inner panel 32. Although FIG. 2 does not show the upward and downward direction middle portion and lower portion of the side door body portion 30, the upward and downward direction middle portion and lower portion of a side door body portion 30 having substantially the same configuration are shown in FIG. 4 showing a later-described third embodiment, so it is advised to refer to FIG. 4. The side door body portion 30 shown in FIG. 2 is configured as an opening and closing body that opens and closes the front side door opening 22 (see FIG. 1).

A glass opening 38 for inserting a door glass 40 therethrough is formed in the upper end portion of the side door body portion 30. The door glass 40 is capable of being housed inside the side door body portion 30. The door glass 40 is raised and lowered along a door frame 36 shown in FIG. 1. The lower end portion of the door frame 36 is attached to the side door body portion 30.

As shown in FIG. 2, a beltline outer reinforcement 42, serving as a reinforcement member and as a beltline reinforcement, and a beltline inner reinforcement 44 are placed inside the side door body portion 30.

The beltline outer reinforcement 42 and the beltline inner reinforcement 44 are formed in long shapes by pressing a sheet metal material (e.g., steel sheets). The beltline outer reinforcement 42 and the beltline inner reinforcement 44 are placed with their longitudinal direction coinciding with the vehicle forward and rearward direction along a beltline 46 (see FIG. 1) of the side door body portion 30. The front end portions of the beltline outer reinforcement 42 and the beltline inner reinforcement 44 reach the neighborhood of the front pillar 12 (see FIG. 1), and the rear end portions of the beltline outer reinforcement 42 and the beltline inner reinforcement 44 reach the neighborhood of the center pillar 14 (see FIG. 1).

The beltline inner reinforcement 44 is placed on the vehicle width direction outside of the upper portion (a part including the upper edge portion) of the door inner panel 32. The beltline inner reinforcement 44 is configured by an upper flange portion 44A, a lower flange portion 44B, and a body portion 44H formed between the upper flange portion 44A and the lower flange portion 44B. The upper flange portion 44A and the lower flange portion 44B are joined via weld portions (not shown in the drawings) to the door inner panel 32. A bead 44H1 that protrudes inward in the vehicle width direction and extends along the vehicle forward and rearward direction is formed in the body portion 44H.

The front end portion of the beltline inner reinforcement 44 is secured to the front end portion of the door inner panel 32, and the rear end portion of the beltline inner reinforcement 44 is secured to the rear end portion of the door inner panel 32. The upper portion of the door inner panel 32 is reinforced by the beltline inner reinforcement 44.

The beltline outer reinforcement 42 is placed on the vehicle width direction inside of the upper portion (a part including the upper edge portion) of the door outer panel 34. The beltline outer reinforcement 42 is configured by an upper flange portion 42A, a lower flange portion 42E, and a body portion 42H formed between the upper flange portion 42A and the lower flange portion 42E. The upper flange portion 42A is a part where the upper end portion of the beltline outer reinforcement 42 is bent inward in the vehicle width direction, and the upper flange portion 42A is placed sloping inward in the vehicle width direction heading in the vehicle downward direction. The upper flange portion 42A is hemmed to a terminal portion 34T on the upper portion side of the door outer panel 34.

The body portion 42H of the beltline outer reinforcement 42 is formed continuously with the base end (upper end) of the upper flange portion 42A. The body portion 42H has a concavo-convex shaped portion 42B configuring its upper portion side and a vertical wall portion 42D configuring its lower portion side. The vertical wall portion 42D is positioned on the vehicle width direction outside of the concavo-convex shaped portion 42B. The lower end of the concavo-convex shaped portion 42B and the upper end of the vertical wall portion 42D are interconnected in the vehicle width direction by a horizontal wall portion 42C. The concavo-convex shaped portion 42B is equipped with a vertical wall-like general portion 42B1 and an upper and lower pair of beads 42B2 and 42B3 that protrude outward in the vehicle width direction and extend along the vehicle forward and rearward direction. The lower flange portion 42E for reinforcement, which slopes in the vehicle upward direction heading inward in the vehicle width direction, is formed continuously with the lower end of the vertical wall portion 42D.

The front end portion of the beltline outer reinforcement 42 is secured to the front end portion of the door outer panel 34, and the rear end portion of the beltline outer reinforcement 42 is secured to the rear end portion of the door outer panel 34. The upper portion of the door outer panel 34 is reinforced by the beltline outer reinforcement 42.

A sensor 50 (detection device) is placed (installed) inside the side door body portion 30 on the vehicle width direction outside of the concavo-convex shaped portion 42B of the beltline outer reinforcement 42. In the drawings, illustration of the cross section of the sensor 50 is omitted and the sensor 50 is schematically depicted. The sensor 50 is placed on the horizontal wall portion 42C of the beltline outer reinforcement 42. The sensor 50 has flange portions 50C on its lower end portion. The flange portions 50 stick out in the vehicle forward direction and the vehicle rearward direction and are secured (fastened) to the horizontal wall portion 42C using bolts. In the drawings, bolt fastening lines are indicated by long dashed short dashed lines 58 instead of the bolts. The sensor 50 secured in this way is placed on the vehicle width direction outside of the position where the door glass 40 is housed inside the side door body portion 30 (the position of the door glass 40 shown in FIG. 2).

A through hole 48 is formed in the concavo-convex shaped portion 42B of the beltline outer reinforcement 42, and a wire 50B from a body section 50H of the sensor 50 is passed through the through hole 48. That is, a section 50X of the wire 50B from the body section 50H of the sensor 50 passed through the through hole 48 from the side of the body section 50H of the sensor 50 is placed on the vehicle width direction inside of the beltline outer reinforcement 42. One end portion of the wire 50B of the sensor 50 is electrically connected to a controller not shown in the drawings. The controller is electrically connected to an electric power steering (EPS) system and a brake electronic control unit (ECU). Although detailed description thereof is omitted here, the vehicle 10 (see FIG. 1) of the present embodiment has a configuration where driving support (advanced driving support) is performed on the basis of information detected by the sensor 50, for example.

The sensor 50 is equipped with a detection component 50A. The detection component 50A faces outward in the vehicle width direction and uses a detection medium to detect information in the side direction of the vehicle. In the present embodiment, a millimeter-wave radar, for example, is used for the sensor 50, the detection medium is radio waves in the millimeter-wave band, and the detection component 50A is a component that emits and a component that receives the radio waves in the millimeter-wave band.

A through portion 52 is formed through the door outer panel body 34H in a range including the section (radio wave scan region) opposing the vehicle width direction outside of the detection component 50A. The through portion 52 is closed off by a transmissive member 34A made of resin. That is, the transmissive member 34A is configured by a member separate from the door outer panel body 34H and is configured to include a transmissive portion 34P configuring the section opposing the vehicle width direction outside of the detection component 50A. The peripheral edge portion of the transmissive member 34A is attached via an adhesive portion (an adhesive not shown in the drawings), for example, to an open peripheral edge portion 52A of the through portion 52 of the door outer panel body 34H. Here, the open peripheral edge portion 52A of the through portion 52 of the door outer panel body 34H is placed on the inside of the side door body portion 30 via a step with respect to a general portion 34N of the door outer panel body 34H. A vehicle width direction outside surface 34Q of the transmissive portion 34P is placed in alignment with a vehicle width direction outside surface 34S of the door outer panel body 34H.

The transmissive member 34A including the transmissive portion 34P is configured by a resin material that allows the radio waves in the millimeter-wave band (the detection medium) detected by the detection component 50A of the sensor 50 to be transmitted through it. The transmissive member 34A of the present embodiment is made of a resin material that is non-transparent and has the same color as the door outer panel body 34H.

(Operation and Effects)

Next, the operation and effects of the above embodiment will be described.

In the present embodiment, the sensor 50 is placed inside the side door body portion 30, and the detection component 50A facing outward in the vehicle width direction uses the radio waves in the millimeter-wave band to detect information in the side direction of the vehicle. Furthermore, the transmissive portion 34P that configures part of the door outer panel 34 and is configured by a material that allows the radio waves in the millimeter-wave band to be transmitted through it is disposed on the vehicle width direction outside of the detection component 50A. This makes it possible for information in the side direction of the vehicle to be detected by the sensor 50, and at the same time the sensor 50 is not exposed to the door outside surface and can be kept waterproof and dustproof.

Furthermore, in the present embodiment, the beltline outer reinforcement 42 placed with its longitudinal direction coinciding with the vehicle forward and rearward direction is disposed inside the side door body portion 30, and the sensor 50 is placed on the vehicle width direction outside of the beltline outer reinforcement 42. For this reason, the detection performance of the sensor 50 is not impeded even when the beltline outer reinforcement 42 is disposed. Furthermore, the sensor 50 is secured to the beltline outer reinforcement 42, so attachment stiffness for the sensor 50 can be ensured and vibration of the sensor 50 during vehicle travel and so forth is controlled. Consequently, the detection precision of the sensor 50 can be kept from being lowered by vibration during vehicle travel and so forth.

Furthermore, in the present embodiment, the sensor 50 is placed on the vehicle width direction outside of the position where the door glass 40 is housed inside the side door body portion 30. Consequently, the detection performance of the sensor 50 is not affected by the door glass 40 even when the door glass 40 is placed in its housed position. Furthermore, the sensor 50 is placed on the vehicle width direction outside of the position where the door glass 40 is housed inside the side door body portion 30 and on the vehicle width direction outside of the beltline outer reinforcement 42, so even when the door glass 40 having water droplets and/or dirt sticking to it is housed in its housed position, the effect that the water droplets and/or dirt has on the sensor 50 can be reduced.

Furthermore, in the present embodiment, the beltline outer reinforcement 42 is secured to the door outer panel 34, so the sensor 50 can be placed further outward in the vehicle width direction. For this reason, the detection precision of the sensor 50 is better ensured.

Furthermore, in the present embodiment, the section 50X of the wire 50B from the body section 50H of the sensor 50 passed through the through hole 48 from the side of the body section 50H of the sensor 50 is placed on the vehicle width direction inside of the beltline outer reinforcement 42. Consequently, the section 50X of the wire 50B from the body section 50H of the sensor 50 passed through the through hole 48 from the side of the body section 50H of the sensor 50 is protected by the beltline outer reinforcement 42, and the effect that the wire 50B has on the detection performance of the sensor 50 can be reduced.

As described above, according to the vehicle side door structure of the present embodiment, the detection precision of the sensor 50 that detects the surroundings in the side direction of the vehicle can be well maintained.

Furthermore, in the present embodiment, the beltline outer reinforcement 42 is placed along the beltline 46 (see FIG. 1), so the sensor 50 can be placed near the upper end portion of the side door body portion 30, and information in the side direction of that height position can be detected by the sensor 50.

Furthermore, in the present embodiment, the transmissive portion 34P is configured by the transmissive member 34A, which is a member separate from the door outer panel body 34H, and is attached to the door outer panel body 34H. Additionally, the vehicle width direction outside surface 34Q of the transmissive portion 34P is placed in alignment with the vehicle width direction outside surface 34S of the door outer panel body 34H. For this reason, even when the door outer panel 34 is equipped with the door outer panel body 34H and the transmissive member 34A, the door outer panel 34 when seen from the vehicle outside is visually attractive.

Second Embodiment

Figure 3:
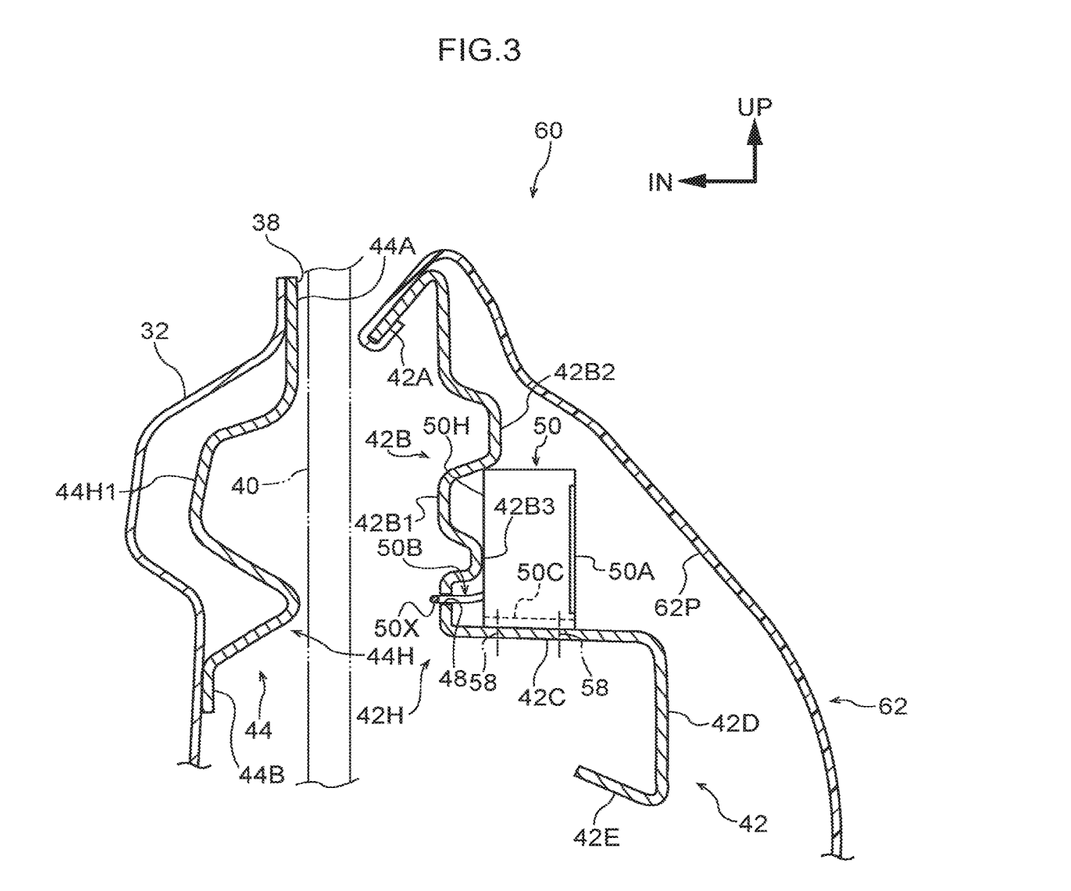
FIG. 3 is a longitudinal sectional view showing a vehicle side door structure pertaining to a second embodiment of the present invention.

Next, a vehicle side door structure pertaining to a second embodiment of the present invention will be described using FIG. 3. In FIG. 3, the vehicle side door structure pertaining to the present embodiment is shown by way of a longitudinal sectional view (a view corresponding to FIG. 2 in the first embodiment) of a cross section seen from the vehicle front side. As shown in FIG. 3, the vehicle side door structure pertaining to the present embodiment differs from the vehicle side door structure pertaining to the first embodiment in that it is equipped with a door outer panel 62 configured by one member instead of the door outer panel 34 (see FIG. 2) configured by two members. Other configurations are the same as those in the first embodiment. Therefore, the same reference signs are assigned to the same constituent parts as those in the first embodiment, and description of those same constituent parts is omitted.

The door outer panel 62 is placed on the cabin exterior side of the door inner panel 32 and, together with the door inner panel 32, configures a side door body portion 60. The side door body portion 60 has the same configuration as the side door body portion 30 (see FIG. 2) of the first embodiment except that it is equipped with the door outer panel 62 instead of the door outer panel 34 (see FIG. 2) of the first embodiment. The door outer panel 62 has generally the same shape as the door outer panel 34 (see FIG. 2) of the first embodiment and is entirely configured by the same resin material as the transmissive portion 34P (see FIG. 2) of the first embodiment. The part of the door outer panel 62 opposing the vehicle width direction outside of the detection component 50A is a transmissive portion 62P of the present embodiment.

According to the configuration of the embodiment described above also, the same action and effects as in the first embodiment are obtained.

Third Embodiment

Next, a vehicle side door structure pertaining to a third embodiment of the present invention will be described using FIG. 4 and with additional reference to FIG. 1 and FIG. 2 as appropriate. In FIG. 4, the vehicle side door structure pertaining to the present embodiment is shown by way of a longitudinal sectional view of a cross section seen from the vehicle front side. In the present embodiment, the beltline outer reinforcement 42 and the beltline inner reinforcement 44 shown in FIG. 2 are not disposed; rather, a beltline reinforcement 70 serving as a reinforcement member shown in FIG. 4 is disposed. The sensor 50 is attached to the beltline reinforcement 70. Other configurations are substantially the same as those in the first embodiment. Therefore, the same reference signs are assigned to the same constituent parts as those in the first embodiment, and description of those same constituent parts is omitted.

As shown in FIG. 4, the beltline reinforcement 70 is placed inside the side door body portion 30 on the vehicle width direction outside of the upper portion of the door inner panel 32. The beltline reinforcement 70 is formed in a long shape by pressing a sheet metal material (e.g., a steel sheet), and the beltline reinforcement 70 is placed with its longitudinal direction coinciding with the vehicle forward and rearward direction along the beltline 46 (see FIG. 1) of the side door body portion 30. The front end portion of the beltline reinforcement 70 reaches the neighborhood of the front pillar 12 (see FIG. 1), and the rear end portion of the beltline reinforcement 70 reaches the neighborhood of the center pillar 14 (see FIG. 1).

The beltline reinforcement 70 is formed in a substantially waveform shape as seen in a sectional view orthogonal to its longitudinal direction. That is, the beltline reinforcement 70 is configured by an upper edge flange portion 70A, a lower edge flange portion 70B, and a body portion 70H having convex portions and concave portions alternately and continuously formed between the upper edge flange portion 70A and the lower edge flange portion 70B. The upper edge flange portion 70A and the lower edge flange portion 70B are joined via weld portions (not shown in the drawings) to the door inner panel 32. The front end portion of the beltline reinforcement 70 is secured to the front end portion of the door inner panel 32, and the rear end portion of the beltline reinforcement 70 is secured to the rear end portion of the door inner panel 32. The upper portion of the door inner panel 32 is reinforced by the beltline reinforcement 70.

The sensor 50 is placed inside the side door body portion 30 on the vehicle width direction outside of the beltline reinforcement 70. The sensor 50 has flange portions 50D on its vehicle width direction inside end portion. The flange portions 50D stick out in the vehicle forward direction and the vehicle rearward direction and are secured (fastened) to the beltline reinforcement 70 using bolts. In the drawings, bolt fastening lines are indicated by long dashed short dashed lines 58 instead of the bolts. In the present embodiment, the sensor 50 is placed on the vehicle width direction inside of the position where the door glass 40 is housed inside the side door body portion 30 (the position of the door glass 40 shown in FIG. 4).

A through hole 72 is formed in the body portion 70H of the beltline reinforcement 70, and a wire 50B from the body section 50H of the sensor 50 is passed through the through hole 72. That is, a section 50Y of the wire 50B from the body section 50H of the sensor 50 passed through the through hole 72 from the side of the body section 50H of the sensor 50 is placed on the vehicle width direction inside of the beltline reinforcement 70. One end portion of the wire 50B of the sensor 50 is electrically connected to a controller not shown in the drawings. The detection component 50A of the sensor 50 faces outward in the vehicle width direction and is placed opposing the transmissive portion 34P in the vehicle width direction.

(Operation and Effects)

According to the embodiment described above also, it is made possible for information in the side direction of the vehicle to be detected by the sensor 50, and at the same time the sensor 50 can be kept waterproof and dustproof. Furthermore, the sensor 50 is secured to the beltline reinforcement 70, so attachment stiffness for the sensor 50 can be ensured and vibration of the sensor 50 during vehicle travel and so forth is controlled. Consequently, the detection precision of the sensor 50 can be kept from being lowered by vibration during vehicle travel and so forth.

Furthermore, in the present embodiment, the section 50Y of the wire 50B from the body section 50H of the sensor 50 passed through the through hole 72 from the side of the body section 50H of the sensor 50 is placed on the vehicle width direction inside of the beltline reinforcement 70. Consequently, the section 50Y of the wire 50B from the body section 50H of the sensor 50 passed through the through hole 72 from the side of the body section 50H of the sensor 50 is protected by the beltline reinforcement 70, and the effect that the wire 50B has on the detection performance of the sensor 50 can be reduced.

As described above, according to the vehicle side door structure of the present embodiment also, the detection precision of the sensor 50 that detects the surroundings in the side direction of the vehicle can be well maintained.

Furthermore, in the present embodiment, the beltline reinforcement 70 is placed with its longitudinal direction coinciding with the vehicle forward and rearward direction along the beltline 46 (see FIG. 1), so the sensor 50 can be placed near the upper end portion of the side door body portion 30, and information in the side direction of that height position can be detected by the sensor 50.

Fourth Embodiment

Figure 5:
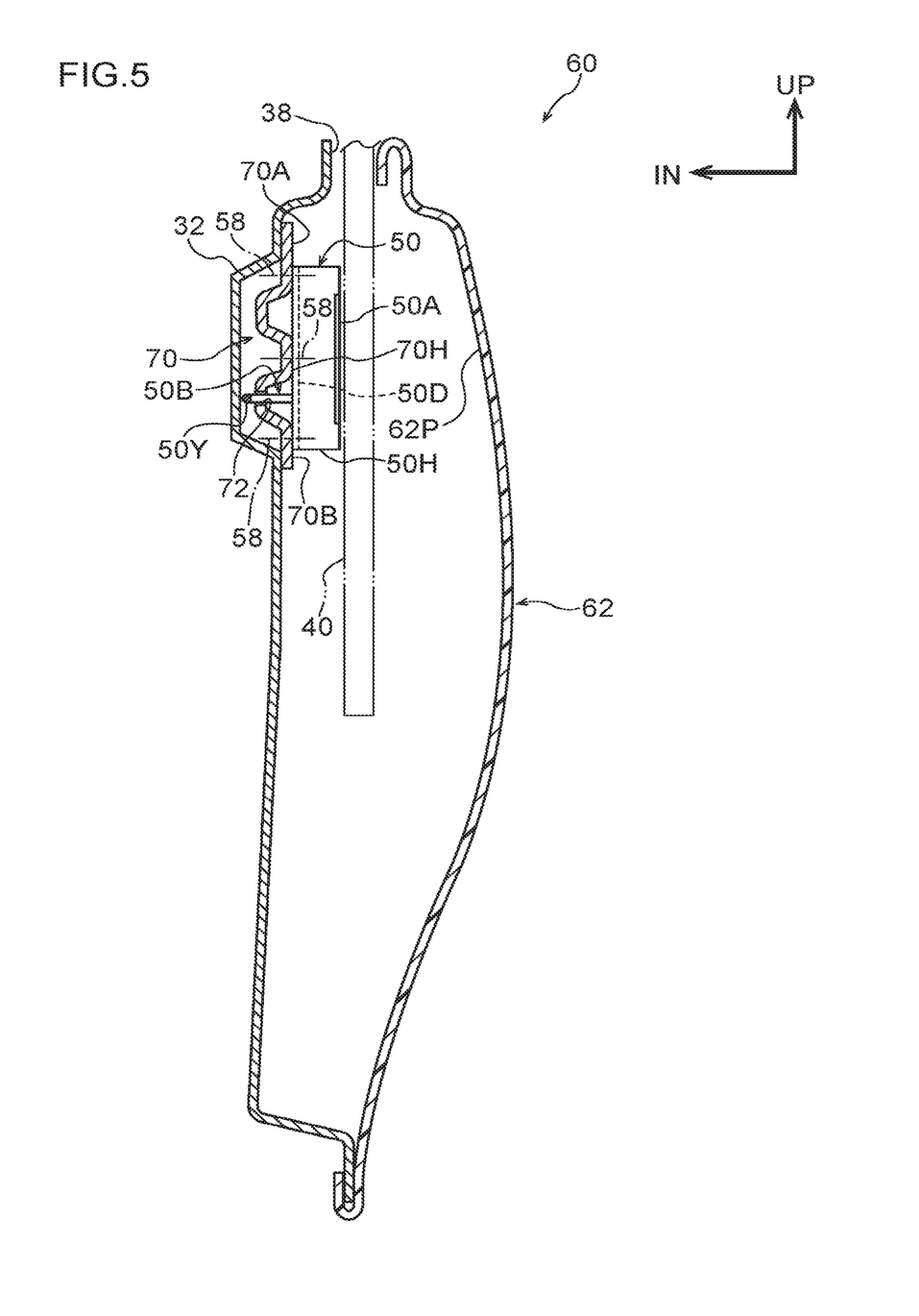
FIG. 5 is a longitudinal sectional view showing a vehicle side door structure pertaining to a fourth embodiment of the present invention.

Next, a vehicle side door structure pertaining to a fourth embodiment of the present invention will be described using FIG. 5. In FIG. 5, the vehicle side door structure pertaining to the present embodiment is shown by way of a longitudinal sectional view of a cross section seen from the vehicle front side. As shown in FIG. 5, the vehicle side door structure pertaining to the present embodiment differs from the vehicle side door structure pertaining to the third embodiment in that it is equipped with the door outer panel 62 configured by one member instead of the door outer panel 34 (see FIG. 4) configured by two members. Other configurations are the same as those in the third embodiment. The door outer panel 62 configured by one member has substantially the same configuration as the door outer panel 62 (see FIG. 3) of the second embodiment. Therefore, the same reference signs are assigned to the same constituent parts as those in the first to third embodiments, and description of those same constituent parts is omitted. According to the configuration of the present embodiment also, the same action and effects as those in the third embodiment are obtained.

Supplemental Description of the Embodiments

Although in the above embodiments a case was described where the present invention is applied to the front side door 24 of the vehicle 10 shown in FIG. 1, the present invention can also be applied to the rear side door 28 of the vehicle 10.

Furthermore, in the above embodiments, a millimeter-wave radar is used for the sensor 50, but another sensor, such as a laser radar, an ultrasonic sensor, or an optical camera, for example, may also be used for the sensor. In a case where a laser radar is used as the sensor, the detection medium is laser light and the detection component is a laser light emitter and receiver. In a case where an ultrasonic sensor is used as the sensor, the detection medium is ultrasonic waves and the detection component is an ultrasonic emitter and receiver. In a case where an optical camera is used as the used, the detection medium is visible light and the detection component is a visible light receiver.

The "detection medium" in the present disclosures refers to a medium detectable by the detection component of the sensor, such as radio waves, light, and ultrasonic waves, for example, like in the above embodiments and the above example modifications.

Furthermore, as an example modification of the above embodiments, in a case where a laser radar or an optical camera is used for the sensor, the transmissive portion is made of a transparent resin material or the like that allows laser light or visible light to be transmitted through it. As another example modification, in a case where an ultrasonic sensor is used for the sensor, the transmissive portion is made of a material that allows ultrasonic waves to be transmitted through it.

Furthermore, as an example modification of the above embodiments, the reinforcement member to which the sensor is secured may also be another reinforcement member such as an impact beam, for example, placed with its longitudinal direction coinciding with the vehicle forward and rearward direction inside the side door body portion. Furthermore, a configuration where the sensor is secured via brackets or the like to the door inner panel or the door outer panel can also be employed. Plural sensors may also be disposed inside the side door body portion because it is relatively easy to ensure space for mounting sensors inside the side door body portion.

Furthermore, as an example modification of the above embodiments, a through hole for passing through it the wire from the body section of the sensor does not have to be formed in the reinforcement member to which the sensor is secured.

The above embodiments and the above example modifications may also be applied to a self-driving vehicle.

The above embodiments and the above plural example modifications can also be appropriately combined and implemented.

Examples of the present invention have been described above, but the present invention is not limited to what is described above and naturally can also be modified and implemented in a variety of ways in addition to what is described above without departing from the spirit thereof.

What is claimed is:

1. A vehicle side door structure comprising:
    a side door body portion configured to open and close a side door opening, the side door body portion including a door inner panel and a door outer panel; and
    a sensor placed inside the side door body portion, the sensor including a detection component configured to face outward in a vehicle width direction and to detect information in a side direction of a vehicle by using a detection medium,
    wherein a transmissive portion is disposed on a vehicle width direction outside of the detection component, the transmissive portion constituting a part of the door outer panel and being made of a material that allows the detection medium to be transmitted through the material.

2. The vehicle side door structure according to claim 1, wherein
    a reinforcement member having a longitudinal direction coinciding with the vehicle forward and rearward direction, the reinforcement member being disposed inside the side door body portion, and
    the sensor is placed on a vehicle width direction outside of the reinforcement member and is secured to the reinforcement member.

3. The vehicle side door structure according to claim 2, wherein
    a door glass is capable of being housed inside the side door body portion, and
    the sensor is placed on a vehicle width direction outside of the position where the door glass is housed inside the side door body portion.

4. The vehicle side door structure according to claim 2, wherein the reinforcement member is secured to the door outer panel.

5. The vehicle side door structure according to claim 2, wherein
    a through hole, through which is passed a wire from a body section of the sensor, is formed in the reinforcement member, and
    the section of the wire passed through the through hole from the side of the body section of the sensor is placed on a vehicle width direction inside of the reinforcement member.

6. The vehicle side door structure according to claim 2, wherein the reinforcement member is a beltline reinforcement placed along a beltline.

7. The vehicle side door structure according to claim 1, wherein
    a door glass is capable of being housed inside the side door body portion, and
    the sensor is placed on a vehicle width direction outside of the position where the door glass is housed inside the side door body portion.

8. The vehicle side door structure according to claim 1, wherein
    the door outer panel includes:
        a door outer panel body, the door outer panel body constituting a portion of the door outer panel and having an aperture formed in a range including a section opposing a vehicle width direction outside of the detection component and
        a transmissive member configured to include the transmissive portion, the transmissive member being attached to the door outer panel body in a state in which the transmissive member closes off the through portion, and a vehicle width direction outside surface of the transmissive portion is placed in alignment with a vehicle width direction outside surface of the door outer panel body.

\* \* \* \* \*